United States Patent [19]
Zucker

[11] 3,983,302
[45] Sept. 28, 1976

[54] MAGNETIC RECORDING MEDIUM
[75] Inventor: Richard S. Zucker, Newtown, Conn.
[73] Assignee: CBS Inc., New York, N.Y.
[22] Filed: Aug. 20, 1973
[21] Appl. No.: 389,834

Related U.S. Application Data
[63] Continuation-in-part of Ser. No. 249,436, May 1, 1972, abandoned, which is a continuation of Ser. No. 73,428, Sept. 18, 1970, abandoned.

[52] U.S. Cl............................. 428/425; 252/62.54; 428/900
[51] Int. Cl.²................................ H01F 10/02
[58] Field of Search...................... 117/235–240; 252/62.54; 428/425, 900

[56] References Cited
UNITED STATES PATENTS

| | | |
|---|---|---|
| 3,470,021 | 9/1969 | Hendricx et al................. 117/239 |
| 3,523,086 | 8/1970 | Bisschops et al................. 252/62.54 |
| 3,525,694 | 8/1970 | Bisschops et al................. 252/62.54 |
| 3,597,273 | 8/1971 | Akashi et al....................... 117/235 |
| 3,650,828 | 3/1972 | Higashi et al...................... 117/235 |

FOREIGN PATENTS OR APPLICATIONS
1,097,613  1/1968  United Kingdom

*Primary Examiner*—Bernard D. Pianalto
*Attorney, Agent, or Firm*—Spencer E. Olson; Martin Novack

[57] ABSTRACT

A magnetic recording medium comprising a base having a coating thereon containing magnetic particles, and wherein the binder contains a vinyl terpolymer and a diisocyanate.

11 Claims, 3 Drawing Figures

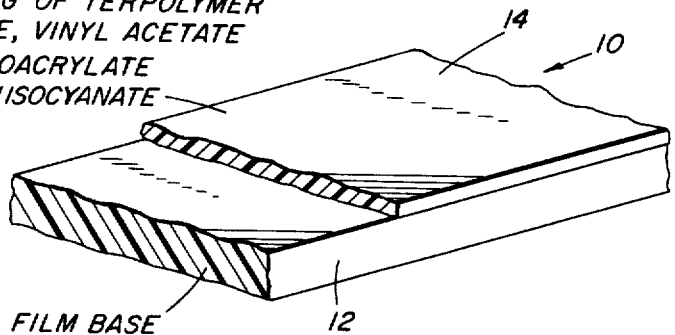
FIG. 1
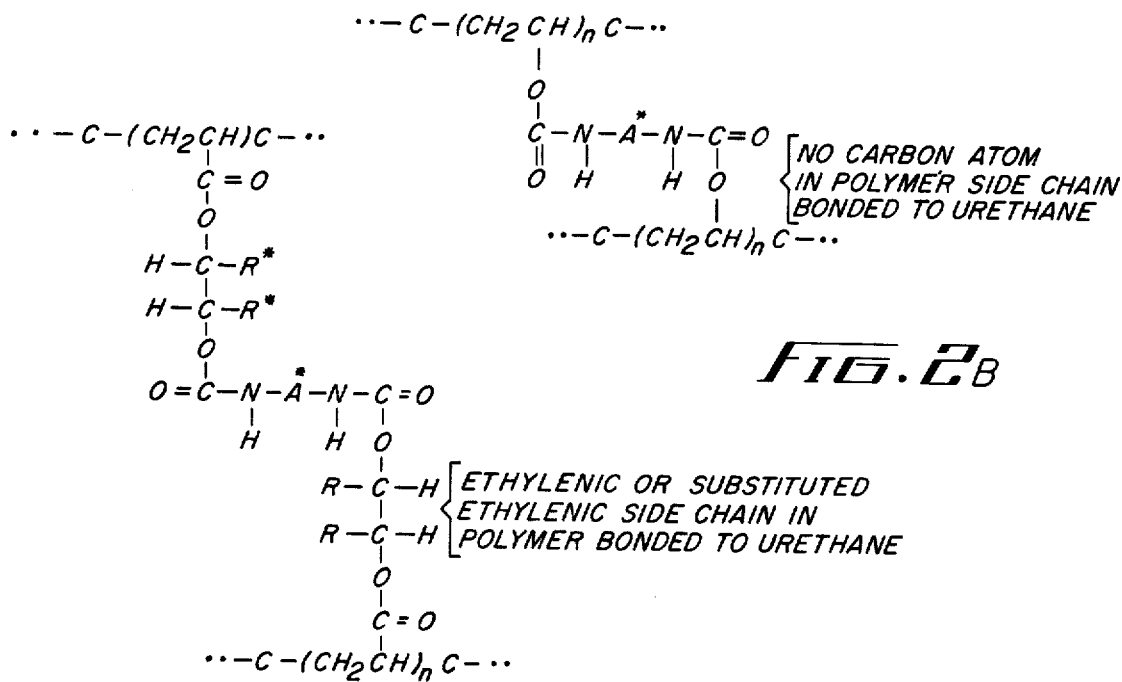
FIG. 2B
FIG. 2A
$\overset{*}{A}$ = ALIFATIC, AROMATIC, ALICYCLIC OR HETEROCYCLIC MOIETY TERMINATED IN TWO ISOCYANATE GROUPS.
$\overset{*}{R}$ = HYDROGEN OR ALKYL GROUP.
INVENTOR.
RICHARD S. ZUCKER
BY
ATTORNEY

MAGNETIC RECORDING MEDIUM

This is a continuation-in-part of now abandoned application Ser. No. 249,436 filed May 1, 1972 now abandoned which is, in turn, a continuation of application Ser. No. 73,428 filed Sept. 18, 1970 now abandoned in the name of Richard S. Zucker.

BACKGROUND OF THE INVENTION

This invention relates to a magnetic recording media of the type comprising a base having a coating of magnetic particles in a polymeric binder, and, more particularly, to an improved binder for such coatings.

Magnetic recording media of the kind herein contemplated, which will be described as being a magnetic tape, comprises a flexible base or tape having a surface coated with magnetic particles in a suitable binder. Such magnetic tape, when used in electronic data processing machines, for example, must withstand extreme mechanical abuse in that it is moved at high speeds with the coating in physical contact with stationary metal parts, such as tape guides and transducer heads. Due to this physical contact with the stationary metal parts, many of the presently used tape coatings are rapidly abraded, with some of the abraded material depositing in the equipment, thereby adversely affecting its operation. Many applications further require that the tape be capable of withstanding relatively high temperatures as, for example, in aircraft crash recorders and in satellite recorders for space exploration. In some applications, too, it is necessary that the magnetic surface be periodically cleaned, usually with an organic solvent, thus imposing the additional requirement that the binder have good solvent resistance. Moreover, the binder must be securely anchored to the base material, typically formed of polyethylene terephthalate or cellulose acetate, and the coating must have good flexibility so as to adhere to the backing material even when crimped or otherwise deformed or subjected to dimensional changes caused by changes in temperature, or by stretching.

A variety of binders have been and are used in the manufacture of magnetic tapes, the selection being made primarily on the basis of their resistance to abrasion. In the late 1950's, for example, highly flexible thermoplastic materials were used as the binder for the magnetic particles; however, the resulting films had poor wear resistance and were somewhat spatially unstable at higher ambient temperatures. Among the binders subsequently used are flexible thermosetting expoxy-based resins, an example being an expoxy-ureaformaldehyde resin as described in U.S. Pat. No. 3,148,082. The resin is combined with a curing agent selected from the class consisting of polyamide resins or triethylene tetramine.

Another known binder material, described in U.S. Pat. No. 3,149,995, consists of a polymeric matrix material consisting essentially of at least one solid, soluble, thermoplastic copolymer of vinyl alcohol and at least one member of the group consisting of vinyl esters, vinyl acetals, vinyl halides, or vinylidene halides, and a diisocyanate-based elastomer. A variation of this coating material is disclosed and claimed in U.S. Pat. No. 3,150,995 which consists of an elastomer binder selected from a particular class of cross-linked diisocyanate-based compositions.

Another conventionally used binder consists of partially hydrolyzed copolymers of vinyl chloride and vinyl acetate blended with a soft elastomer, such as diisocyanate-based elastomers, in proper proportions to give the desired adhesion and mechanical properties.

SUMMARY OF THE INVENTION

It is the object of the present invention to provide a magnetic recording medium having improved adhesion of the magnetic layer to the substrate, improved flexibility, increased toughness for improved wear resistance, better solvent resistance and greater temperature stability than available media.

Briefly, the magnetic recording medium of the invention comprises a base, such as an oriented polyethylene terephthalate film, having a coating thereon comprising magnetic particles dispersed in a binder. The binder consists essentially of a ternary copolymer and a diisocyanate. The ternary copolymer preferably contains 51 to 94% by weight of vinyl chloride, 16 to 2% by weight of vinyl acetate and 33 to 4% by weight of a glycol monoacrylate or glycol monomethacrylate. When the material is heated, the blocked diisocyanate becomes unblocked to release the diisocyanate and allow it to function as a curing agent. Thus, the result is a diisocyanate-cured vinyl copolymer—a one resin system which is internally plasticized during the curing process. Stated another way, the third polymer in the ternary copolymer permits internal plasticization of the copolymer, with all of the ingredients chemically bonded together, to provide a superior coating. Unlike the partially hydrolyzed copolymers of vinyl chloride and vinyl acetate, such as Union Carbide's VAGH resin, which contain a percentage of vinyl alcohol and becomes brittle when cross-linked with isocyanates, the binder system of the present invention becomes more flexible.

DESCRIPTION OF THE DRAWING

The invention is described in more detail in the following portion of the specification in conjunction with the accompanying drawing in which:

FIG. 1 is a sectional view of a typical recording element embodying the invention; and FIG. 2A and 2B are illustrations of the formulas of two organic compounds useful in explaining the advantages of the invention.

DESCRIPTION OF THE PREFERRED EMBODIMENT

A recording element 10 of the invention is illustrated in FIG. 1, and comprises a base 12 and a coating 14 of magnetic particles in a terpolymer binder on a surface thereof.

The base 12 functions as a support for the entire structure, and may be formed from any one of a variety of materials selected according to its mechanical and temperature resistance properties for the particular application in which the magnetic medium is to be used. For example, the base may be an oriented polyethylene terephthalate film, marketed under the trademark "Mylar", cellulose acetate, oriented polyvinyl chloride, or polyimide film marketed by E. I. DuPont de Nemours & Co., Inc., Wilmington, Delaware, under the trademark "Kapton". The base 12 is typically 1.5 mils thick, although other thicknesses, preferably in the range between 0.50 and 2.5 mils, may be used. The base 12 may be any width, depending largely on the coating methods used, and the application in which the magnetic medium is to be used, and is usually processed in long continuous sheets, usually thousands of feet long.

Any of the usual magnetic particles may be used in the recording element of the invention. For example, one may use metallic oxide particles, such as acicular ferric oxide particles prepared by any known process, and in a preferred embodiment comprises a magnetic pigment marketed by the Pfizer Co. as thier Type No. CX-6011.

The binder for the coating 14 is the principal feature of the present invention. There are few coating compositions and finders that satisfy all of the requirements for all applications to which the recording medium may be put which, of course, include electronic data processing equipment, video recorders, audio tape casettes and cartridges. For all of these uses, the coating is desirably abrasion resistant, flexible, resilient, chemically stable, and strongly adherent to the base, and the selection is usually made as a compromise among these requirements.

The binder system of the present invention derives its effectiveness from the use therein of copolymers of vinyl chloride and vinyl acetate and a third monomer which contains hydroxyl groups, and more particularly, the terpolymer of vinyl chloride, vinyl acetate and a glycol monocrylate or monomethacrylate described in British Pat. No. 1,097,613 published Jan. 3, 1968. This copolymer has the desirable properties of strength and elongation, but by itself does not produce a satisfactory coating for a magnetic medium of the kind here under consideration. Applicant has found, however, that when this terpolymer is formulated with a diisocyanate as a curing agent, and cured at elevated temperature after application to the base, a superior coating is produced. In the curing process, the reaction of the diisocyanate with active hydroxyl groups in the terpolymer produces urethane. The result is an internally plasticized one-resin system, the superior properties of which are believed to be attributable to a flexible linkage of carbon atoms in the polymer side chain bonded to the urethane.

As shown in FIG. 2A, which is the formula of a unit of the cured one-resin system, the polymer side chain containing two carbons forms a carbon chain cross-link with the isocyanate which connects other long chains together to form a flexible two-dimensional network. On the other hand, partially hydrolyzed copolymers of vinyl chloride and vinyl acetate, which contain a percentage of vinyl alcohol, such as Union Carbide VAGH resin, as shown in FIG. 2B, has no carbon in the side chain and thereby forms a less flexible cross-link with other chains of the polymer. It is believed that this is the reason why VAGH resin is less flexible when crosslinked with isocyanate, whereas the internally plasticized one-resin system of the present invention becomes more flexible.

Nominally, the presence of the two carbon atoms in the polymer side chain improves the flexibility of the cured polymer so as to make it particularly useful as a magnetic medium. Variation in the degree of flexibility, again as a compromise among the other properties of the coating, may be obtained by using different glycol monoacrylates, such as ethylene glycols or butylene glycols in the form of their monacrylic esters or monomethacrylic esters, as the third monomer.

Applicant has also found that an even further improved binder can be obtained by formulating the described terpolymer with a diisocyanate-terminated prepolymer, the prepolymer including, for example, methylene bis-(4 phenylisocyanate) (MDI) and a polyester (polyethelene glycol adapate) or MDI and a polyether (polycapralactone polyol). It is believed that the high molecular weight of the polyester or the polyether contributes further to the desirable properties of flexibility and adherence of the ultimate material.

The following non-limiting examples illustrate preferred methods of practicing the invention.

EXAMPLE I

A mixture was made containing 30.3 parts by weight of magnetic pigment CX-6011, marketed by Pfizer Corp., 43.2 parts by weight of a solution of a ternary copolymer consisting of 87% vinyl chloride, 5% vinyl acetate and 8% propylene glycol monoacrylate (41% in butyl acetate), 24.6 parts by weight of a solvent for the ternary copolymer, 0.39 parts by weight of silicone SF-1017, a lubricating agent marketed by the General Electric Company, and 1.51 parts by weight of a pigment wetting agent, Gafac RM-410, marketed by GAF Corp. The solvent for the ternary copolymer was a solution of 40% by weight of methyl ethyl ketone, 30% by weight of tetrahydrofuran, 20% by weight of cyclohexanone, and 10% by weight of isophorone.

After these ingredients were milled in a container with ⅜ inch diameter steel balls for approximately 120 hours, 3.92 parts by weight (referenced to the proportions of the other ingredients) of Mondur CB-75, a diisocyanate comprising an adduct of tolylene diisocyanate and trimethylolpropane, produced by Mobay Chemical Co., and marketed by Naftone Co., New York, N.Y., was added, and the mixture milled for an additional one hour. The mixture was then filtered through a 5 micron filter and coated on a 1.5 mil polyester base to a dry thickness of about 0.3 mil. The thus-coated tape was cured for 2 days at a temperature of 170°F. The finished tape had good magnetic properties, was flexible and strongly adherent to the base, and was insoluble in acetone, cholorform, MEK, MIBK, DMF and other solvents.

EXAMPLE II

Example I was repeated with similar formula compounded with vinyl stabilizers, and the mixture was coated on 2.0 mil Kapton (DuPont Polyimide film). The finished tape had a strongly adherent, flexible coating and was serviceable at temperatures as high as 300°F.

EXAMPLE III

A mixture was made containing 179.2 parts by weight of magnetic pigment MO-2230, marketed by Pfizer Corp., 7.2 parts of a 2/1 mixture by weight of wetting agents lecithin and sarcosyl O (Ciba-Geigy Corp.), 71.3 parts of a 30% (solids by weight content) solution of a ternary copolymer consisting of 77% vinyl chloride, 15% vinyl acetate and 8% propylene glycol monoacrylate in a solvent consisting of 85% tetrahydrofuran and 15% toluene by weight and 113.4 parts of the same solvent mixture.

After these ingredients were milled in a container with ⅛ inch diameter steel balls for 90 minutes, 34.4 parts by weight (referenced to the proportions of the other ingredients) of Multrathane F-242 (50% by weight solids in tetrahydrofuran), and MDI polyester prepolymer available from Mobay Chemical Co., was added and the mixture milled for an additional 15 minutes. The mixture was then filtered through a 10 micron-filter and coated on a 1.5 mil polyester base to a dry coating thickness of 0.51 mil. The coated tape was cured for 1 hour at 150°F. The finished tape had good electrical properties, was extremely flexible and strongly adherent to the base and was insoluble in methyl ethyl ketone and other solvents. The properties of the tape were found to be superior even to those produced in Examples I and II.

EXAMPLE IV

Example III was repeated with a similar formula except that a polyether prepolymer of polycapralactone polyol and MDI was used instead of Multrathane F-242. The actual weights used are 174.7 parts of MO-2230, 7.0 parts of 2/1 lecithin/Sarcosyl O mixture, 77.7 parts of 30% terpolymer solution and 106.6 parts of solvent mixture. After milling 90 minutes 38.0 parts of a 50% solution (solids by weight in THF) of a prepolymer formed from one mole of PCP-0210 (Union Carbide Corp.) and 2 moles of MDI was added as well as 72.6 parts of the above solvent mixture. After filtration, coating and curing as set forth in Example III, the finished tape was tested and found to exhibit electrical properties that were superior to those measured in Example III.

It will be appreciated also that wetting agents other than the one specified may be used, and, likewise, since the silicone added as a lubricant does not affect the curing of the terpolymer, it may be omitted if desired. Also, although a specific magnetic iron oxide was used in the example, other pigments can be used without departing from the spirit of the invention.

I claim:

1. A magnetic recording medium comprising a backing material and an adherent coating thereon, said coating comprising magnetic particles dispersed in a resinous binder, said binder containing a polyurethane derived from a terpolymer and a diisocyanate, said terpolymer containing vinyl chloride, vinyl acetate, and a third monomer selected from the group consisting of glycol monoacrylate and glycol monomethacrylate, said terpolymer containing 51 to 94% by weight of vinyl chloride, 16 to 2% by weight of vinyl acetate, and 33 to 4% by weight of said third monomer.

2. A magnetic recording medium according to claim 1 wherein said terpolymer contains the following percentages: vinyl chloride 87%; vinyl acetate 5%; and propylene glycol monoacrylate 8%.

3. A magnetic recording medium according to claim 1 wherein the third monomer of the terpolymer contains an ethylenic or substituted ethylenic carbon chain.

4. A magnetic recording medium comprising a backing material and an adherent coating thereon, said coating comprising magnetic particles dispersed in a resinous binder, said binder containing a polyurethane derived from a terpolymer and a diisocyanate-terminated prepolymer, said terpolymer containing vinyl chloride, vinyl acetate, and a third monomer selected from the group consisting of glycol monoacryalate and glycol monomethacryalate and said prepolymer containing a diisocyanate and a constituent selected from the group consisting of a polyester and a polyether, said terpolymer containing 51 to 94% by weight of vinyl chloride, 16 to 2% by weight of vinyl acetate, and 33 to 4% by weight of said third monomer.

5. A magnetic recording medium according to claim 4 wherein the diisocyanate is methylene bis-(4-phenylisocyanate).

6. A magnetic recording medium according to claim 4 wherein said constituent is a polyester.

7. A magnetic recording medium according to claim 6 wherein said polyester comprises polyethylene glycol adapate.

8. A magnetic recording medium according to claim 4 wherein said constituent is a polyether.

9. A magnetic recording medium according to claim 8 wherein said polyether is polycaprolactone polyol.

10. A magnetic recording medium according to claim 9 wherein said diisocyanate is methylene bis-(4-phenylisocyanate).

11. A magnetic recording medium according to claim 7 wherein said diisocyanate is methylene bis-(4-phenylisocyanate).

* * * * *